(12) United States Patent
Perry et al.

(10) Patent No.: US 8,031,696 B2
(45) Date of Patent: Oct. 4, 2011

(54) SYSTEM AND METHOD FOR ROUTING VOIP CALLS

(75) Inventors: Mathew C. Perry, Plano, TX (US); Chen Cao, Lewisville, TX (US)

(73) Assignee: Genband US LLC, Plano, TX (US)

( * ) Notice: Subject to any disclaimer, the term of this patent is extended or adjusted under 35 U.S.C. 154(b) by 697 days.

(21) Appl. No.: 11/078,531

(22) Filed: Mar. 11, 2005

(65) Prior Publication Data
US 2006/0203803 A1 Sep. 14, 2006

(51) Int. Cl.
*H04L 12/66* (2006.01)
*H04L 12/28* (2006.01)
*G06F 15/173* (2006.01)

(52) U.S. Cl. .......... 370/352; 370/395.52; 370/400; 370/251; 370/395.2; 709/224; 709/236

(58) Field of Classification Search .......... 370/352, 370/351, 395.52, 355, 251, 248, 395.1, 237, 370/224, 241, 252, 402, 395.2, 395.3, 400; 709/224, 223, 236
See application file for complete search history.

(56) References Cited

U.S. PATENT DOCUMENTS

| | | | |
|---|---|---|---|
| 6,330,316 B1 | 12/2001 | Donak et al. | |
| 6,680,952 B1 | 1/2004 | Berg et al. | |
| 6,683,877 B1* | 1/2004 | Gibbs et al. | 370/395.2 |
| 6,748,433 B1* | 6/2004 | Yaakov | 709/224 |
| 6,799,210 B1* | 9/2004 | Gentry et al. | 709/223 |
| 6,832,254 B1* | 12/2004 | Scoggins et al. | 709/227 |
| 7,173,910 B2 | 2/2007 | Goodman | |
| 7,203,172 B2* | 4/2007 | MacArthur et al. | 370/241 |
| 2002/0085506 A1 | 7/2002 | Hundscheidt et al. | |
| 2002/0131604 A1 | 9/2002 | Amine | |
| 2003/0053463 A1* | 3/2003 | Vikberg et al. | 370/395.1 |
| 2004/0057385 A1 | 3/2004 | Roshko | |
| 2004/0062204 A1 | 4/2004 | Bearden et al. | |
| 2004/0240389 A1* | 12/2004 | Bessis et al. | 370/252 |
| 2004/0252646 A1 | 12/2004 | Adhikari et al. | |
| 2005/0083844 A1* | 4/2005 | Zhu et al. | 370/230.1 |
| 2006/0203801 A1 | 9/2006 | Li et al. | |
| 2006/0245350 A1* | 11/2006 | Shei et al. | 370/216 |
| 2007/0183339 A1 | 8/2007 | Rousell et al. | |
| 2007/0280123 A1 | 12/2007 | Atkins et al. | |

FOREIGN PATENT DOCUMENTS

EP 1 487 152 A1 12/2004

(Continued)

OTHER PUBLICATIONS

Final Official Action for U.S. Appl. No. 11/087,247 (Jul. 22, 2008).

(Continued)

*Primary Examiner* — Aung S Moe
*Assistant Examiner* — Jamal Javaid
(74) *Attorney, Agent, or Firm* — Jenkins, Wilson, Taylor & Hunt, P.A.

(57) ABSTRACT

A method of routing a voice call from a local media gateway to a terminating media gateway comprises determining IP network connectivity between the local media gateway and terminating media gateway and generating monitoring results, updating network resource status according to the monitoring results, generating a plurality of routes between the local media gateway and the terminating media gateway in response to the updated network resource status, determining a best route from the plurality of routes, and routing the voice call using the best route.

13 Claims, 2 Drawing Sheets

FOREIGN PATENT DOCUMENTS

| | | |
|---|---|---|
| WO | 02/05068 A2 | 1/2002 |
| WO | WO 2004/012403 A1 | 2/2004 |
| WO | 2004/030288 A1 | 4/2004 |
| WO | WO 2006/095262 A2 | 9/2006 |
| WO | WO 2005/022844 A1 | 10/2006 |

OTHER PUBLICATIONS

Interview Sumamry for U.S. Appl. No. 11/078,247 (May 1, 2008).
Official Action for U.S. Appl. No. 11/078,247 (Dec. 12, 2007).
International Search Report and Written Opinion of the International Searching Authority for PCT Application No. PCT/IB2006/000537 (Aug. 31, 2006).
Busse, et al., "Dynamic QoS Control of Multimedia Applications Based on RTP," Retrieved from Internet www.cs.ucsb.edu/~ebelding/courses/276/f04/papers/Schulzrinne_RTP.ps.gz, printed Aug. 17, 2006, 13 pgs. (May 30, 1995).
Official Action for U.S. Appl. No. 11/078,247 (Apr. 1, 2009).
Final Official Action for U.S. Appl. No. 11/078,247 (Jan. 5, 2010).
Interview Summary for U.S. Appl. No. 11/078,247 (Nov. 17, 2009).
Final Official Action for U.S. Appl. No. 11/078,247 (Aug. 4, 2010).
Interview Summary for U.S. Appl. No. 11/078,247 (Jan. 20, 2011).

* cited by examiner

SYSTEM AND METHOD FOR ROUTING VOIP CALLS

BACKGROUND

Connectivity and voice quality are key reliability issues in today's VoIP (voice over Internet Protocol) networks. Today's VoIP users increasingly expect the Quality of Service (QoS) of the call to be equal or close to that of the Public Switched Telephone Network (PSTN). Because network conditions may change rapidly and continuously, connectivity for a VoIP call cannot be guaranteed. Further, IP network problems such as packet loss, packet delay, and out of order delivery may lead to deteriorating quality of VoIP voice calls.

Unlike data connections, a real-time application like voice calls place much stricter requirements on packet delivery sequence and time. Significant packet loss, packet delay, and out of order delivery problems make telephone conversations difficult. Users may experience echoes and talk overlap that are perceived as significant indicators of inferior QoS.

Previously, voice call routing only exists in the voice network domain, which is characterized by logical trunk groups interconnecting switches in the network. Voice routing in this context involves routing on circuits or logical trunk groups. The IP network routing function previously only operate in the data network domain and is not operable with the applications operating in the application layer. Therefore, routing voice calls on a data network to satisfy QoS remained a challenge unconquered by the industry.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
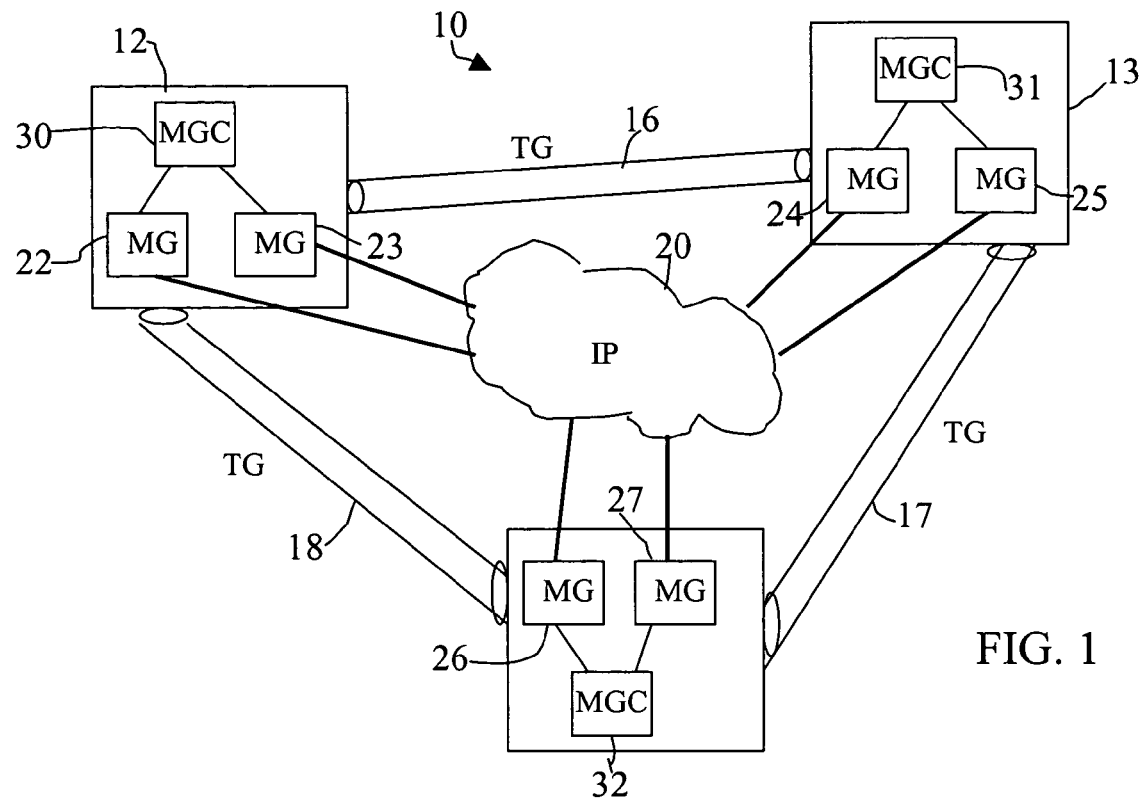
FIG. 1 is a simplified block diagram of an embodiment of a VoIP network.

It is to be understood that the following disclosure describes many different examples for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations unless otherwise specified.

FIG. 1 is a simplified block diagram of an embodiment of a VoIP network 10. VoIP network 10 is shown comprising a plurality of media gateway nodes 12-14 interconnected by logical trunk groups 16-18 and the Internet 20, however, it should be understood that the network configuration shown in FIG. 1 is merely exemplary. Logical trunk groups 16-18 comprise a plurality of circuits or transmission channels that are capable of interconnecting telephony calls. Media gateway nodes 12-14 each comprises a plurality of multimedia media gateways (MG) 22-27 coupled to a multimedia gateway controller (MGC) 30-32, which is sometimes referred to as a softswitch. Multimedia gateways 22-27 each may comprise one or more switching fabric of the same or different types for routing telephony calls. The switching fabrics may be packet-switching matrices and/or non-packet switching matrices. The multimedia gateways may be coupled to their respective multimedia gateway controller via an ATM (Asynchronous Transfer Mode) or IP (Internet Protocol) backbone network, for example. Multimedia gateway controllers 30-32 provides call processing control and user interface functions for TDM (Time Division Multiplex), ATM, IP, and other traffic processed, switched and routed by multimedia gateways 22-27. The multimedia gateways coupled to a multimedia gateway controller may be geographically distributed. The VoIP path bearer between the media gateway nodes may comprise ATM, MPLS (Multi-Protocol Label Switching), IP, or other bearer paths. VoIP network 10 enables two users using IP telephone devices such as a telephone operating pursuant to SIP (Session Initiation Protocol) or another suitable protocol to communicate with one another.

The multimedia gateway nodes may convert data from a format, protocol, and/or type required for one network to another format, protocol, and/or type required for another network, and/or otherwise convert data from a first type of data on a first transmission link to a second type of data on a second transmission link. The multimedia gateway nodes may terminate channels from a circuit-switched network and pass streaming media for a packet-switched network, such as Real-Time Transport Protocol (RTP) streams transported via User Datagram Protocol (UDP) in an IP network. Input data for the media gateway may include audio, video, and/or T.120 (real-time multi-point communications), among others, which the media gateway may handle simultaneously or otherwise.

Figure 2:
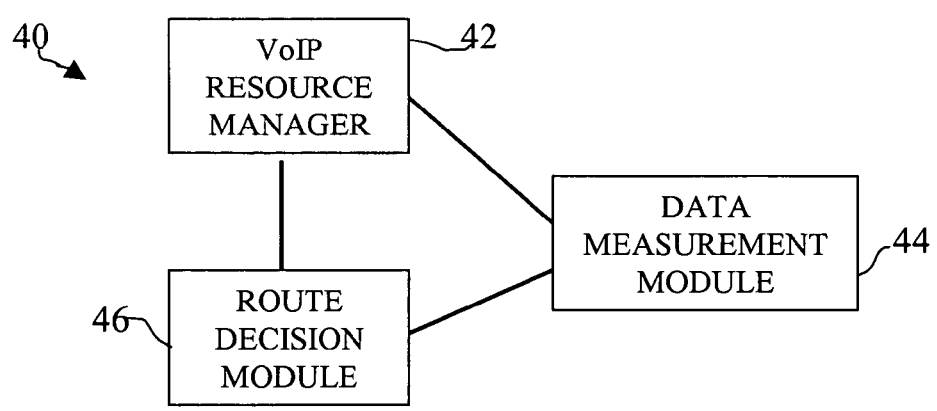
FIG. 2 is a simplified logical block diagram of an embodiment of a system for VoIP call routing.

FIG. 2 is a simplified logical block diagram of an embodiment of a system for VoIP call routing 40. System 40 may reside within each multimedia gateway controller. System 40, which may also be referred to as a VoIP call routing engine, comprises at least three logical modules: a VoIP resource manager 42, a data measurement module 44, and a route decision module 46. System 40 is operable to intelligently route VoIP calls around segments of the network that experience congestion, link failure, node failure or other problems. Because voice calls are very sensitive to adverse network conditions that cause packet delay, out-of-order delivery, packet loss and other problems, the avoidance of congested network segments significantly improves the QoS of the VoIP call.

Figure 3:
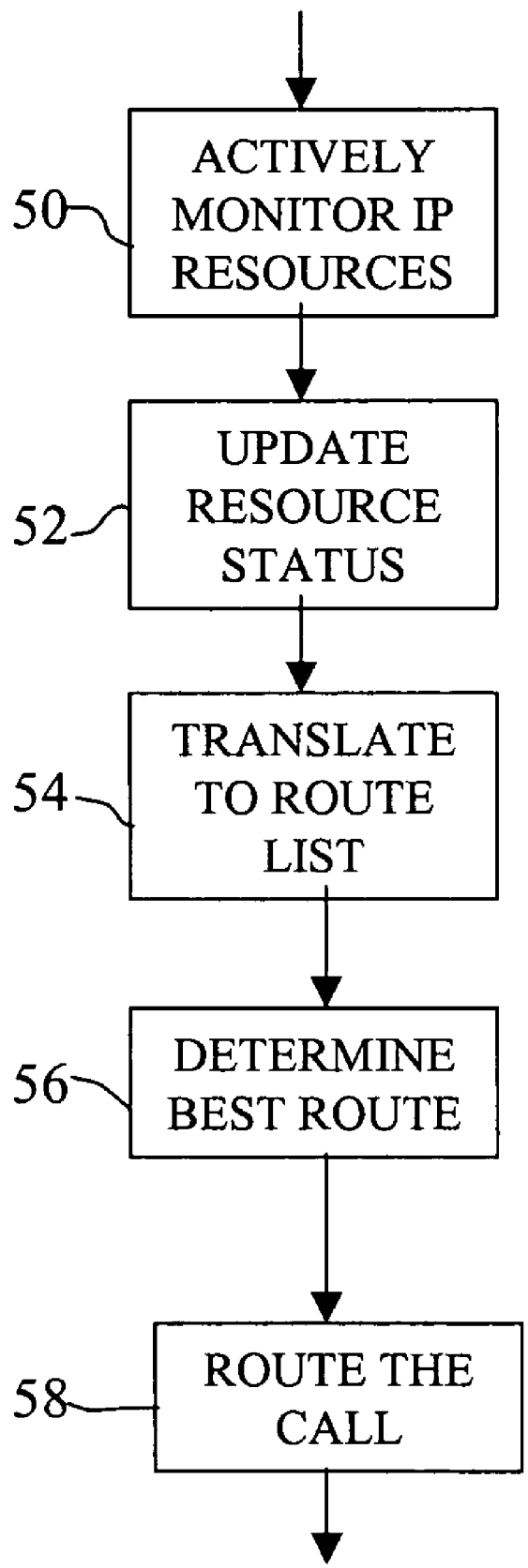
FIG. 3 is a simplified flowchart of an embodiment of a method for VoIP call routing.

Referring also to FIG. 3, the operation of system 40 is described below. FIG. 3 is a simplified flowchart of an embodiment of a method for VoIP call routing. In step 50, data measurement module 44 actively monitors the call resources to determine their availability and current status. In step 50, a call resource may be defined as a logical trunk group and the local IP endpoint. This call resource may be so defined as a routing object according to object oriented programming. The local IP endpoint may be a local multimedia gateway coupled to the multimedia gateway controller. The state of the routing object is based on the availability of connections between the local IP endpoint to all remote IP endpoints reachable by the respective logical trunk group. For example, the state of the routing object based on multimedia gateway 23 and logical trunk group 16 is based on the aggregated data on connection availability between multimedia gateway 23 to multimedia gateway 24 and to multimedia gateway 25.

Therefore, if a determination is made that there is a reliability issue associated with the local IP endpoint communicating with all remote IP endpoints referenced by the respective logical trunk group, then that route object is noted as being congested and not available.

In step 52, data measurement module 44 updates VoIP resource manager 42 on the measured resource status. In step 54, the resource status results is then used to formulate a route list or routing table by VoIP resource manager 42. The route list identifies IP endpoint to IP endpoint routes that are not experiencing problems. The routes in the route list may include IP paths as well as TDM paths. The route list may be prioritized by some predetermined criteria such as reachability and availability. The route list is then made available to route decision module 46 each time it is updated or refreshed. The route list may include TDM paths as well as IP paths. The route list may be prioritized or other organized according to some predetermined criteria, such as availability or amount of congestion. In step 56, for each voice call, route decision module 46 determines the best route based on the route list. The best route may include TDM paths as well as IP paths. In step 58, the voice call is set up and routed using the best route determined by route decision module 46. The best route may be defined as a route that contains paths or segments that best meets a predetermined requirement, such as exceeding a predetermined threshold of availability.

One method to perform resource monitoring and assessment is described in co-pending patent application Ser. No. 11/078,247 entitled "System and Method for Determining Network Quality for VoIP Calls," incorporated herein by reference. However, other means for monitoring and measuring the IP network condition may instead be employed. For example, a connectivity check or diagnostic tool may be used to determine network conditions such as congestion or node/link failure.

As employed herein, the term "network" may be used to refer to an entire network or to a network portion, a network application, and/or network apparatus. To that end, one or more instances of the multimedia gateway and/or softswitch, or components thereof, may be singularly or collectively employed to bridge two or more networks, including those of PSTNs and voice-over-packet (VoP) networks, among others. PSTN networks may employ TDM, among other non-packet formats and/or protocols. VoP networks may employ ATM, VoIP, universal-mobile-telecommunications-service (UTMS), code-division-multiple-access (CDMA, such as CDMA2000 and/or W-CDMA), voice-over-digital-subscriber-line (VoDSL), other formats and/or protocols, and/or combinations thereof.

Previously, there were no routing engines that integrate IP-based networks and traditional voice networks to determine the best route to route voice calls. Voice call routing previously only exists in the voice network domain, which is characterized by logical trunk groups interconnecting switches in the network. Voice routing in this context involves routing on logical trunk groups. The IP network routing function previously only operate in the data network domain and is not operable with the applications operating in the application layer. Information relating to problems detected in the network previously has not been used in routing voice calls.

What is claimed is:

1. A method of routing a voice call from an originating media gateway to a terminating media gateway, comprising:
    in a media gateway controller of the originating media gateway:
        determining an availability of a plurality of routes between the originating media gateway and terminating media gateway, wherein the originating media gateway and the terminating media gateway are each controlled by a different media gateway controller, wherein the media gateway controller of the originating media gateway does not control the terminating media gateway, and, for the routes determined to be available, determining a congestion level;
        prioritizing the plurality of routes between the originating media gateway and the terminating media gateway based on the determined availabilities and congestion levels;
        determining, from the prioritized routes, a best route from the plurality of routes; and
        routing the voice call from the originating media gateway to the terminating media gateway using the best route, wherein determining a best route comprises selecting a route that is least congested, wherein routing the voice call includes the media gateway controller of the originating media gateway selecting, based on the best route, an IP endpoint at the terminating media gateway for receiving the voice call and setting up the voice call.

2. The method of claim 1, wherein determining an availability of a plurality of routes comprises continuously monitoring network connectivity between a local IP endpoint associated with the originating media gateway and all IP endpoints reachable by a logical trunk group associated with the local IP endpoint.

3. The method of claim 1, wherein determining an availability of a plurality of routes comprises continuously monitoring network connectivity between all local IP endpoints associated with the originating media gateway to all IP endpoints reachable by a logical trunk group associated with the local IP endpoints.

4. The method of claim 1, wherein prioritizing the plurality of routes comprises prioritizing a plurality of routes comprising data and voice paths.

5. The method of claim 1, wherein prioritizing the plurality of routes comprises prioritizing a plurality of routes comprising IP and TDM paths.

6. The method of claim 1, wherein determining a best route comprises selecting a route that best meets a predetermined criteria.

7. A method of routing a VoIP call from a local IP endpoint to a terminating media gateway, comprising:
    in a media gateway controller of the local IP endpoint:
        defining a routing object having the local IP endpoint and a logical trunk group associated with the local IP endpoint;
        determining at least one of a congestion and an availability state of the routing object, wherein determining the state of the routing object comprises determining connection between the local IP endpoint and all remote IP endpoints reachable by the logical trunk group;
        generating a plurality of routes between the local IP endpoint and the terminating media gateway in response to at least the state of the routing object;
        prioritizing the plurality of routes between the local IP endpoint and the terminating media gateway based on determined availabilities and congestion levels;
        determining, from the prioritized routes, a best route from the plurality of routes; and
        routing the VoIP call from the local IP endpoint to the terminating media gateway using the best route, wherein determining a best route comprises selecting a route that is least congested, wherein the local IP endpoint and the terminating media gateway are each controlled by a different media gateway controller, wherein the media gateway controller of the local IP endpoint does not control the terminating media gateway, wherein routing the voice call includes the media gateway controller of the local IP endpoint selecting, based on the best route, an IP endpoint at the terminating media gateway for receiving the voice call and setting up the voice call.

8. The method of claim 7, wherein generating a plurality of routes comprises generating a plurality of IP, TDM and IP/TDM routes.

9. The method of claim 7, wherein determining a best route comprises selecting a route that best meets a predetermined criteria.

10. A node comprising a media gateway controller of a local IP endpoint, the media gateway controller including a VoIP call routing engine, the VoIP call routing engine comprising:
 a data measurement component located in the media gateway controller and being operable to monitor an availability of a plurality of routes between the local IP endpoint and a terminating media gateway, wherein the local IP endpoint and the terminating media gateway are each controlled by a different media gateway controller, wherein the media gateway controller of the local IP endpoint does not control the terminating media gateway, and, for the routes determined to be available, determining a congestion level;
 a VoIP resource manager located in the medial gateway controller and being operable to prioritize the plurality of routes between the local IP endpoint and the terminating media gateway based on the determined availabilities and congestion levels; and
 a route decision component located in the media gateway controller and being operable to determine, from the prioritized routes, a best route from the plurality of routes and route the VoIP call from the local IP endpoint to the terminating media gateway using the best route, wherein determining a best route comprises selecting a route that is least congested, wherein routing the voice call includes the media gateway controller of the local IP endpoint selecting, based on the best route, an IP endpoint at the terminating media gateway for receiving the voice call and setting up the voice call.

11. The media gateway controller of claim 10, further comprising a routing object associated with the local IP endpoint and a logical trunk group.

12. A system for routing a VoIP call, the system comprising:
 a node comprising a media gateway controller of a local IP endpoint, the media gateway controller comprising:
  a data measurement component operable to continuously monitoring an availability of a plurality of routes between the local IP endpoint and a terminating media gateway, wherein the local IP endpoint and the terminating media gateway are each controlled by a different media gateway controller, wherein the media gateway controller of the local IP endpoint does not control the terminating media gateway, and, for the routes determined to be available, determining a congestion level;
  a VoIP resource manager operable to prioritizing a plurality of routes between the local IP endpoint and the terminating media gateway based on the determined availabilities and congestion levels; and
  a route decision component operable to determining a best route from among the prioritized routes and routing the VoIP call from the local IP endpoint to the terminating media gateway using the best route, wherein determining a best route comprises selecting a route that is least congested, wherein routing the voice call includes the media gateway controller of the local IP endpoint selecting, based on the best route, an IP endpoint at the terminating media gateway for receiving the voice call and setting up the voice call.

13. A VoIP system comprising:
 a logical trunk group between a local IP endpoint and a terminating media gateway, wherein the local IP endpoint and the media gateway are each controlled by a different media gateway controller, wherein the media gateway controller of the local IP endpoint does not control the terminating media gateway;
 the media gateway controller of the local IP endpoint comprising:
  a data measurement module operable to determine at least one of a congestion and an availability state of the routing object, wherein determining the state of the routing object comprises determining connection between the local IP endpoint and all remote IP endpoints reachable by the logical trunk group;
  a VoIP resource manager operable to generate and prioritize a plurality of routes between the local IP endpoint and the terminating media gateway via mapping a logical circuit contained in the logical trunk group to the IP endpoint, in response to the monitoring results; and
  a route decision module operable to determine a best route from the plurality of routes and route the VoIP call from the local IP endpoint to the media gateway using the best route, wherein determining a best route comprises selecting a route that is least congested, wherein routing the voice call includes the media gateway controller of the local IP endpoint selecting, based on the best route, an IP endpoint at the terminating media gateway for receiving the voice call and setting up the voice call.

* * * * *